US008027506B2

(12) United States Patent
Rhoads

(10) Patent No.: US 8,027,506 B2
(45) Date of Patent: *Sep. 27, 2011

(54) GEOGRAPHICAL ENCODING IMAGERY AND VIDEO

(75) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 121 days.

This patent is subject to a terminal disclaimer.

(21) Appl. No.: 12/401,403

(22) Filed: Mar. 10, 2009

(65) Prior Publication Data

US 2010/0067734 A1    Mar. 18, 2010

Related U.S. Application Data

(63) Continuation of application No. 11/238,183, filed on Sep. 27, 2005, now Pat. No. 7,502,489, which is a continuation of application No. 09/997,400, filed on Nov. 28, 2001, now Pat. No. 6,950,519, which is a continuation-in-part of application No. 09/800,093, filed on Mar. 5, 2001, now Pat. No. 7,061,510.

(51) Int. Cl.
*G06K 9/00* (2006.01)
*H04L 9/32* (2006.01)
(52) U.S. Cl. .................................. 382/100; 713/176
(58) Field of Classification Search .................. 382/100, 382/232, 240; 380/51, 54, 210, 252, 287; 370/522–529; 283/72, 74–81, 85, 93, 113, 283/901, 902; 358/3.28; 348/461, 463; 713/176, 713/179
See application file for complete search history.

(56) References Cited

U.S. PATENT DOCUMENTS

| | | | |
|---|---|---|---|
| 4,504,910 A | 3/1985 | Araki et al. | |
| 4,631,678 A | 12/1986 | Angermuller | |
| 5,113,445 A | 5/1992 | Wang | |
| 5,214,757 A | 5/1993 | Mauney et al. | |
| 5,280,537 A | 1/1994 | Sugiyama | |
| 5,329,108 A | 7/1994 | Lamoure | |
| 5,385,371 A | 1/1995 | Izawa | |
| 5,499,294 A | 3/1996 | Friedman | |
| 5,502,576 A | 3/1996 | Ramsay et al. | |
| 5,608,405 A | 3/1997 | Pritt | |
| 5,664,018 A | 9/1997 | Leighton | |
| 5,812,962 A | 9/1998 | Kovac | |
| 5,825,892 A | 10/1998 | Braudaway et al. | |
| 5,861,841 A | 1/1999 | Gildea et al. | |

(Continued)

FOREIGN PATENT DOCUMENTS

EP    0 947 953    10/1999

(Continued)

OTHER PUBLICATIONS

Notice of Allowance (dated Dec. 17, 2004), Appeal Brief (dated Sep. 20, 2004) and Office Action (dated May 7, 2004) from parent U.S. Appl. No. 09/800,093.

(Continued)

*Primary Examiner* — Abolfazl Tabatabai

(57) ABSTRACT

The presently claimed invention relates generally to encoding imagery and video. One claim recites a method including: obtaining data representing an image or video captured from an aerial platform; and utilizing a multi-purpose computer processor configured to: control communication of the data; and steganographically encode the data to include information representing polynomial coefficients associated with at least one geographic dimension. Other combinations and claims are provided as well.

20 Claims, 1 Drawing Sheet

U.S. PATENT DOCUMENTS

| | | | |
|---|---|---|---|
| 5,889,868 A * | 3/1999 | Moskowitz et al. | 713/176 |
| 5,889,898 A | 3/1999 | Koren et al. | |
| 5,901,178 A | 5/1999 | Lee et al. | |
| 5,919,730 A | 7/1999 | Gasper et al. | |
| 5,926,581 A | 7/1999 | Pritt | |
| 5,958,051 A | 9/1999 | Renaud et al. | |
| 5,964,821 A | 10/1999 | Brunts et al. | |
| 5,974,423 A | 10/1999 | Margolin | |
| 5,987,136 A | 11/1999 | Schipper et al. | |
| 5,990,826 A | 11/1999 | Mitchell | |
| 6,005,936 A | 12/1999 | Shimizu | |
| 6,023,278 A | 2/2000 | Margolin | |
| 6,031,914 A * | 2/2000 | Tewfik et al. | 380/54 |
| 6,044,182 A * | 3/2000 | Daly et al. | 382/284 |
| 6,122,403 A * | 9/2000 | Rhoads | 382/233 |
| 6,130,741 A * | 10/2000 | Wen et al. | 355/40 |
| 6,150,972 A | 11/2000 | Bickel et al. | |
| 6,175,639 B1 | 1/2001 | Satoh et al. | |
| 6,177,943 B1 | 1/2001 | Margolin | |
| 6,181,802 B1 | 1/2001 | Todd | |
| 6,185,312 B1 | 2/2001 | Nakamura et al. | |
| 6,201,881 B1 | 3/2001 | Masuda | |
| 6,205,249 B1 | 3/2001 | Moskowitz | |
| 6,209,094 B1 * | 3/2001 | Levine et al. | 713/176 |
| 6,243,480 B1 | 6/2001 | Zhao et al. | |
| 6,246,777 B1 | 6/2001 | Agarwal et al. | |
| 6,249,226 B1 | 6/2001 | Harrison | |
| 6,263,438 B1 | 7/2001 | Walker et al. | |
| 6,282,362 B1 | 8/2001 | Murphy et al. | |
| 6,289,453 B1 | 9/2001 | Walker | |
| 6,301,360 B1 | 10/2001 | Bocionek et al. | |
| 6,310,956 B1 | 10/2001 | Morito et al. | |
| 6,311,214 B1 | 10/2001 | Rhoads | |
| 6,320,829 B1 | 11/2001 | Matsumoto et al. | |
| 6,324,573 B1 | 11/2001 | Rhoads | |
| 6,332,149 B1 | 12/2001 | Warmus et al. | |
| 6,332,193 B1 | 12/2001 | Glass et al. | |
| 6,341,350 B1 | 1/2002 | Miyahara et al. | |
| 6,343,138 B1 | 1/2002 | Rhoads | |
| 6,345,104 B1 | 2/2002 | Rhoads | |
| 6,351,439 B1 | 2/2002 | Miwa et al. | |
| 6,359,998 B1 * | 3/2002 | Cooklev | 382/100 |
| 6,389,151 B1 | 5/2002 | Carr et al. | |
| 6,401,206 B1 | 6/2002 | Khan et al. | |
| 6,408,082 B1 | 6/2002 | Rhoads et al. | |
| 6,408,331 B1 | 6/2002 | Rhoads | |
| 6,411,725 B1 | 6/2002 | Rhoads | |
| 6,418,232 B1 | 7/2002 | Nakano et al. | |
| 6,427,020 B1 | 7/2002 | Rhoads | |
| 6,448,979 B1 | 9/2002 | Schena | |
| 6,452,594 B1 | 9/2002 | Kamen et al. | |
| 6,493,514 B1 | 12/2002 | Stocks et al. | |
| 6,496,802 B1 | 12/2002 | van Zoest | |
| 6,498,984 B2 | 12/2002 | Agnew et al. | |
| 6,504,571 B1 | 1/2003 | Narayanaswami et al. | |
| 6,505,160 B1 | 1/2003 | Levy et al. | |
| 6,512,835 B1 | 1/2003 | Numao | |
| 6,522,770 B1 | 2/2003 | Seder et al. | |
| 6,532,541 B1 | 3/2003 | Chang et al. | |
| 6,542,927 B2 | 4/2003 | Rhoads | |
| 6,556,688 B1 | 4/2003 | Ratnakar | |
| 6,614,914 B1 | 9/2003 | Rhoads et al. | |
| 6,625,297 B1 | 9/2003 | Bradley | |
| 6,636,249 B1 | 10/2003 | Rekimoto | |
| 6,650,761 B1 | 11/2003 | Rodriguez et al. | |
| 6,664,976 B2 | 12/2003 | Lofgren et al. | |
| 6,768,980 B1 | 7/2004 | Meyer et al. | |
| 6,947,571 B1 | 9/2005 | Rhoads et al. | |
| 6,950,519 B2 | 9/2005 | Rhoads | |
| 6,973,198 B2 | 12/2005 | Patton et al. | |
| 6,993,152 B2 | 1/2006 | Patterson et al. | |
| 7,042,470 B2 | 5/2006 | Rhoads et al. | |
| 7,061,510 B2 | 6/2006 | Rhoads | |
| 7,084,903 B2 | 8/2006 | Narayanaswami et al. | |
| 7,098,931 B2 | 8/2006 | Patterson et al. | |
| 7,099,492 B2 | 8/2006 | Rhoads | |
| 7,136,502 B2 | 11/2006 | Kumar | |
| 7,184,572 B2 | 2/2007 | Rhoads | |
| 7,197,160 B2 | 3/2007 | Rhoads et al. | |
| 7,254,249 B2 | 8/2007 | Rhoads et al. | |
| 7,466,840 B2 | 12/2008 | Rhoads | |
| 7,502,489 B2 | 3/2009 | Rhoads | |
| 7,502,490 B2 | 3/2009 | Rhoads | |
| 7,650,008 B2 | 1/2010 | Rhoads | |
| 7,751,588 B2 | 7/2010 | Rhoads | |
| 2001/0001854 A1 | 5/2001 | Schena et al. | |
| 2001/0002931 A1 | 6/2001 | Maes et al. | |
| 2001/0019611 A1 | 9/2001 | Hilton | |
| 2001/0020270 A1 | 9/2001 | Yeung | |
| 2001/0022667 A1 | 9/2001 | Yoda | |
| 2001/0026377 A1 | 10/2001 | Ikegami | |
| 2001/0026616 A1 | 10/2001 | Tanaka | |
| 2001/0026629 A1 | 10/2001 | Oki | |
| 2001/0030759 A1 | 10/2001 | Hayashi et al. | |
| 2001/0031064 A1 | 10/2001 | Donescu et al. | |
| 2001/0033674 A1 | 10/2001 | Chen et al. | |
| 2001/0034835 A1 | 10/2001 | Smith | |
| 2001/0039546 A1 | 11/2001 | Moore et al. | |
| 2001/0046307 A1 | 11/2001 | Wong | |
| 2001/0051964 A1 | 12/2001 | Warmus et al. | |
| 2002/0001395 A1 | 1/2002 | Davis et al. | |
| 2002/0002679 A1 | 1/2002 | Murakami et al. | |
| 2002/0006212 A1 | 1/2002 | Rhoads et al. | |
| 2002/0009209 A1 | 1/2002 | Inoue et al. | |
| 2002/0044690 A1 | 4/2002 | Burgess | |
| 2002/0046178 A1 | 4/2002 | Morito et al. | |
| 2002/0057340 A1 | 5/2002 | Fernandez | |
| 2002/0059520 A1 | 5/2002 | Murakami et al. | |
| 2002/0065844 A1 | 5/2002 | Robinson et al. | |
| 2002/0069370 A1 | 6/2002 | Mack et al. | |
| 2002/0075298 A1 | 6/2002 | Schena et al. | |
| 2002/0080396 A1 | 6/2002 | Silverbrook et al. | |
| 2002/0095586 A1 | 7/2002 | Doyle et al. | |
| 2002/0095601 A1 | 7/2002 | Hind et al. | |
| 2002/0106105 A1 | 8/2002 | Pelly et al. | |
| 2002/0122564 A1 | 9/2002 | Rhoads et al. | |
| 2002/0124171 A1 | 9/2002 | Rhoads | |
| 2002/0124173 A1 | 9/2002 | Stone | |
| 2002/0135600 A1 | 9/2002 | Rhoads et al. | |
| 2002/0136531 A1 | 9/2002 | Harradine | |
| 2002/0147910 A1 | 10/2002 | Brundage et al. | |
| 2002/0159765 A1 | 10/2002 | Maruyama et al. | |
| 2002/0168069 A1 | 11/2002 | Tehranchi et al. | |
| 2002/0191810 A1 | 12/2002 | Fudge et al. | |
| 2003/0011684 A1 | 1/2003 | Narayanaswami | |
| 2003/0012562 A1 | 1/2003 | Lawandy et al. | |
| 2003/0032033 A1 | 2/2003 | Anglin et al. | |
| 2003/0040326 A1 | 2/2003 | Levy et al. | |
| 2003/0048908 A1 | 3/2003 | Hamilton | |
| 2003/0053654 A1 | 3/2003 | Patterson et al. | |
| 2003/0063319 A1 | 4/2003 | Umeda et al. | |
| 2003/0069693 A1 | 4/2003 | Snapp et al. | |
| 2003/0074556 A1 | 4/2003 | Chapman et al. | |
| 2003/0083098 A1 | 5/2003 | Yamazaki et al. | |
| 2003/0090690 A1 | 5/2003 | Katayama et al. | |
| 2004/0046774 A1 | 3/2004 | Rhoads et al. | |
| 2004/0153663 A1 | 8/2004 | Clark et al. | |
| 2004/0162981 A1 | 8/2004 | Wong | |
| 2004/0201676 A1 | 10/2004 | Needham | |
| 2004/0221244 A1 | 11/2004 | Baldino | |
| 2007/0052730 A1 | 3/2007 | Patterson et al. | |
| 2007/0116325 A1 | 5/2007 | Rhoads et al. | |
| 2008/0025561 A1 | 1/2008 | Rhoads et al. | |
| 2008/0080737 A1 | 4/2008 | Rhoads et al. | |
| 2009/0238403 A1 | 9/2009 | Rhoads et al. | |

FOREIGN PATENT DOCUMENTS

| | | |
|---|---|---|
| EP | 0 953 938 | 11/1999 |
| EP | 935 872 | 11/2001 |
| EP | 1220152 | 7/2002 |
| GB | 2371934 | 8/2002 |
| JP | 2000 41144 | 2/2000 |
| WO | WO 99/17537 | 4/1999 |
| WO | WO 01/05075 | 1/2001 |
| WO | WO01/24113 | 4/2001 |
| WO | WO01/39121 | 5/2001 |

| WO | WO01/76253 | 10/2001 |
| WO | WO02/03328 | 1/2002 |
| WO | WO02/33650 | 4/2002 |

OTHER PUBLICATIONS

Notice of Allowance (dated Dec. 17, 2004), Appeal Brief (dated Sep. 20, 2004) and Office Action (dated May 14, 2004) from assignee's U.S. Appl. No. 10/002,954.

Barlett, "Digital Watermarking, The Unseen Advantage" Geo Informatics, Jun. 2001 (3 pages).

Bender et al., "Techniques for Data Hiding," SPIE vol. 2420, Jan. 1995, pp. 164-173.

Caronni, "Assuring Ownership Rights for Digital Images," Published in the Proceedings of 'Reliable IT Systems,' VIS '95, HH. Bruggemann and W. Gerhardt-Hackl (Ed.), Vieweg Publishing Company, Germany, 1995, Jun. 14, 1994, 10 pages.

Carp, "Steven wonders of the imaging world", International Contact, Oct./Nov. 2000, pp. 36/I-36/IV.

Friedman, "The Trustworthy Digital Camera: Restoring Credibility to the Photographic Image," IEEE Transactions on Consumer Electronics, vol. 39, No. 4, Nov. 1993, pp. 905-910.

http://web.archive.org/web/20010305033241/http://www.kodak.com/country/US/en/corp/researchDevelopment/technologyFeatures/digitalWatermarking.shtml, "Invisible Watermarking"; archive dated of Mar. 5, 2001 (4 pages, including Internet Archive Wayback Machines cover page).

Koch et al., "Digital Copyright Labeling: Providing Evidence of Misuse and Tracking Unauthorized Distribution of Copyrighted Materials," OASIS Magazine, Dec. 1995, 3 pages.

Manjunath, "Image Processing in the Alexandria Digital Library Project," Proc. IEEE Int. Form on Research and Tech. Advances in Digital Libraries—ADL '98, pp. 180-187.

Seybold Seminars: Keynote: Digital Imaging Day, comments from panel including Daniel Carp, panel discussion occuring on Aug. 28, 2000 (8 pages).

Yeung et al., "Digital Watermarks: Shedding Light on the Invisible," Nov.-Dec. 1998, IEEE Micro vol. 18, No. 6, pp. 32-41.

Zhao et al., "Embedding Robust Labels Into Images for Copyright Protection," Proc. of the International Congress on Intellectual Property Rights for Specialized Information, Knowledge and New Technologies (Vienna, Austria) Aug. 21-25, 1995, 10 pages.

Zhao, "Digital 138-146. Watermark Mobile Agents," Proc. of NISSC'99, Arlington, VA, Oct. 18-21, 1999, pp. 138-146.

* cited by examiner

GEOGRAPHICAL ENCODING IMAGERY AND VIDEO

RELATED APPLICATION DATA

This application is a continuation of U.S. patent application Ser. No. 11/238,183, filed Sep. 27, 2005 (U.S. Pat. No. 7,502,489), which is a continuation of U.S. patent application Ser. No. 09/997,400, filed Nov. 28, 2001 (U.S. Pat. No. 6,950,519), which is a continuation-in-part of U.S. patent application Ser. No. 09/800,093, filed Mar. 5, 2001 (U.S. Pat. No. 7,061,510), the disclosures of which are incorporated by reference.

FIELD OF THE INVENTION

The present invention relates to digital watermarking, and more particularly relates to digital watermarking as applied in the geophysical sciences.

BACKGROUND AND SUMMARY OF THE INVENTION

Imagery commonly has a geographical aspect, e.g., a photograph may depict a particular place. It is often important to be able to precisely geographically locate a point within a picture or other image, e.g., for purposes of natural resources extraction, mapping, etc.

In accordance with one embodiment of the invention, auxiliary data is steganographically embedded within an image to permit locations of points within the image to be determined.

This and other features and advantages of the present invention will be more readily apparent from the following detailed description, which proceeds with reference to the accompany drawings.

DETAILED DESCRIPTION

Figure 1:
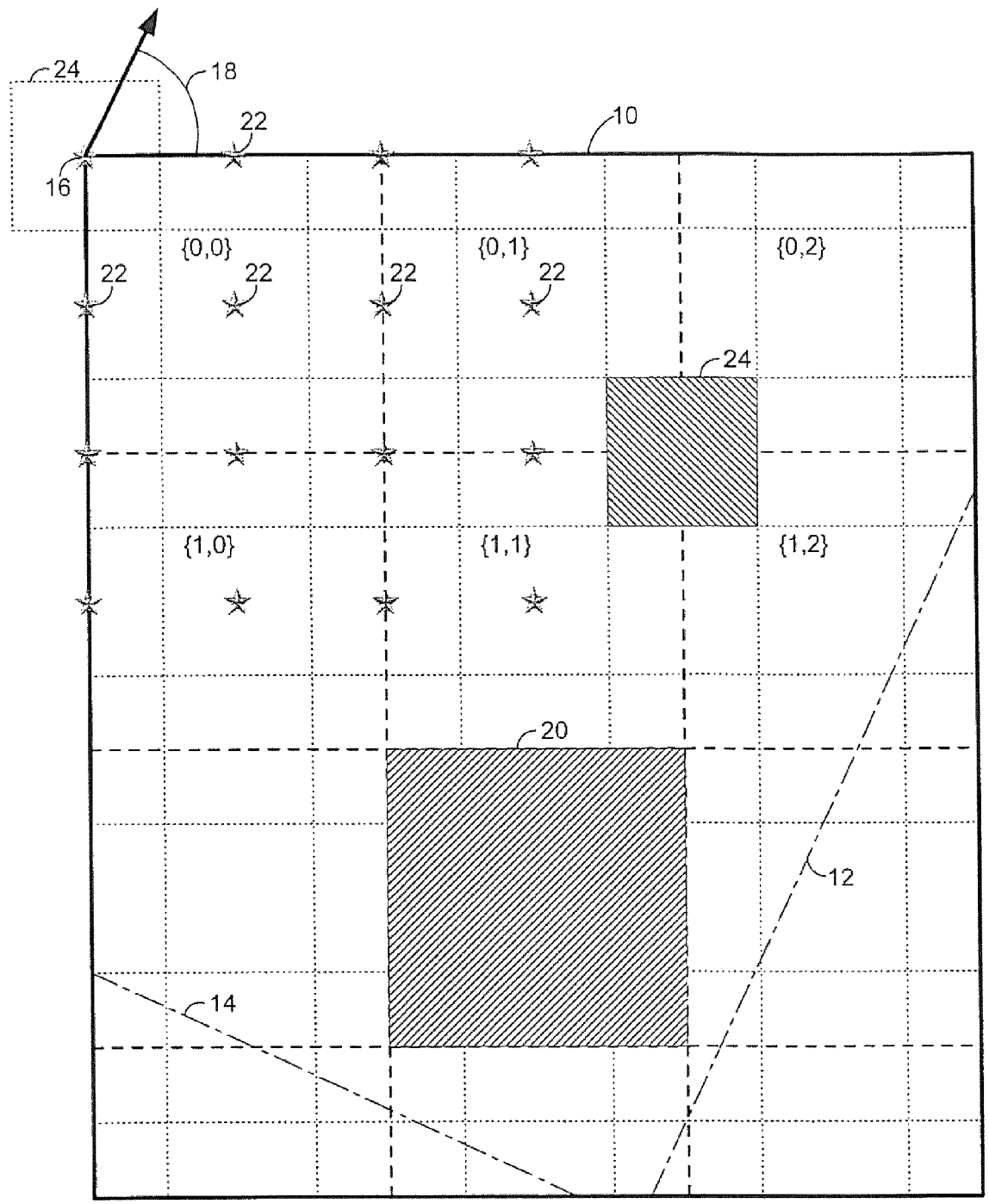
FIG. 1 shows a (blank) image on which different grids and indicia relating to one embodiment of the invention are shown.

FIG. 1 shows a representative (but blank) image 10 (composed of rows and columns of pixels, not particularly shown). For purposes of discussion, image 10 may be an aerial photo of land, but it should be recognized that imagery 10 is not so limited.

Due to various factors (e.g., camera lens artifacts, and the perspective from which the photo was taken, etc.), the rectangular photo typically does not depict a rectangular area of land. Instead, the area of land depicted may actually be trapezoidal, or of other shape.

Overlaid on the FIG. 1 image are sample latitude and longitude lines 12, 14. These are virtual and do not appear in the actual image. (The straightness of the lines is unusual. In most landscape images, the receding horizon tends to curve any latitude or longitude projections that are not parallel to the image boundaries.)

Each point depicted in the image 10 has a unique position that may be expressed by latitude and longitude (and, if 3D accuracy is desired, elevation) coordinates. In accordance with an illustrative embodiment of the invention, such position data for a single location depicted in the image is determined. (Various techniques can be employed, e.g., reference to a pre-existing map or database, ground-truth measurements using GPS equipment, etc.) This location, and the pixel 16 corresponding thereto in the image, are termed the "arbitrary origin" in the discussion that follows. (For expository convenience, the arbitrary origin in this discussion is the upper-left-most pixel in the image, and the ground point corresponding thereto.)

The image 10 is digitally watermarked across its extent with a payload that includes the coordinates of the arbitrary origin (e.g., latitude/longitude/elevation). In addition, the watermark payload also includes a parameter (e.g., angle 18) identifying the orientation of a vector pointing from the arbitrary origin to a known direction (e.g., true north). The watermark payload can also include a scale datum, e.g., indicating that 100 pixels to the right (along the row) from the arbitrary origin corresponds to a distance—on land—of 250 yards.

As noted, a rectangular image generally does not depict a rectangular piece of land. Moreover, even if a photo is taken from directly overhead—using a lens that introduces no aberrations—there is the slight complication posed by the fact that longitudinal lines are not parallel, but meet at the poles. Accordingly, if high accuracy is desired, the watermark can additionally convey coefficients for one or more polynomials (e.g., one for each coordinate axis), which model the apparent warp of the photographic depiction along different axes. (In an exemplary arrangement 5 coefficients of 8 bits each are provided for the latitude and longitude polynomials, and 6 coefficients of 8 bits each are provided for the elevation polynomial.)

Thus, in an exemplary embodiment, the watermark payload may comprise the following (196 bits total):

| | |
|---|---|
| Arbitrary origin latitude | 20 bits |
| Arbitrary origin longitude | 20 bits |
| Arbitrary origin elevation | 16 bits |
| Orientation vector | 12 bits |
| Polynomial coefficients that model warp in latitude dimension | 40 bits |
| Polynomial coefficients that model warp in longitude dimension | 40 bits |
| Polynomial coefficients that model warp in elevation dimension | 48 bits |

Digital watermarking is not belabored in this specification because such technology is well understood by artisans in the field of steganography. Briefly, however, watermarking typically works by making subtle changes to the brightness of image pixels, conveying message payloads that can be detected by suitable detector software or hardware. The embedding process generally adjusts to the unique characteristics of the image, placing a stronger watermark signal in areas with rich detail and a weaker watermark signal in areas with little detail. Because the payload is carried by the image's pixels, it is file-format independent. The payload can survive most normal processing operations, such as compression, edits, file format transformations, copying, scanning and printing. Some watermarking techniques are also robust against rotation and scaling, e.g., through use of embedded calibration data, or auto-correlation techniques.

Any watermarking technique can be employed in the present invention, provided the requisite number of watermark payload bits can be embedded without introducing objectionable corruption into the image. Suitable watermarking technologies are disclosed, e.g., in patent publications U.S. Pat. Nos. 6,122,403, 6,044,182, and WO 99/45705, and in pending U.S. application Ser. No. 09/503,881 (now U.S. Pat. No. 6,614,914).

In a particular embodiment, the watermark payload is represented in a single 128×128 pixel patch 20, which is then tiled across the image (with local scaling to reduce visibility). Each patch comprises 16,384 pixels. In FIG. 1, one of the patches 20 is indicated by cross-hatching for ease of identification.

To enhance robustness, the watermark payload may be processed, e.g., by BCH, Reed-Solomon, convolutional, or turbo coding, or the like, to provide error detecting/correcting capability. Such coding has the effect of transforming the 196 bit payload bits into, e.g., 320 bits ("raw bits"). Each of the 16,384 pixels in the patch is encoded with one of these raw bits, so that each such bit is represented about 50 times per patch. The pixels corresponding to a single raw bit are desirably distributed across the patch, so that severe corruption of a small area of the watermarked image does not irretrievably lose certain raw bits.

On the detection side, the image is processed to retrieve the 320 raw bits, and then the 196 payload bits are determined from the raw bits. From these payload bits, a user of the image knows the geographical coordinates of the point at the arbitrary origin and, through use of the other encoded parameters, can deduce the geographical location of any other point depicted in the image.

In other embodiments, more elaborate watermark encoding can be used. For example, instead of tiling the identical watermark patch over and over across the image, each patch can be slightly different, e.g., encoding the position of that tile within the array of tiles. In one arrangement the tile position data is a pair of numbers indicating tile-row/tile-column offsets from the tile containing the arbitrary origin. Referring to FIG. 1, the tile containing the arbitrary origin 16 may be designated {0,0}. The tile next to it in the row may be designated {0,1}, etc. These index values may be encoded as 5 bits each, which bits are included in the watermark payload. This arrangement offers advantages in environments in which image cropping, rotation, or other image transformations may occur. By decoding the payload from a watermark tile, its location relative to the arbitrary origin can be determined, and the location of the arbitrary origin 16 can thus be inferred (even if that point has been cropped out of the image).

In still other embodiments, information about the image perspective can be conveyed through a watermark. Various forms of representation are possible. In one, the image perspective data can comprise the compass angle at which the camera is pointing ($\theta$), and the elevation angle between the arbitrary origin point and the camera ($\phi$). The former may be represented, e.g., by 10 bits, the latter by 8. Additionally or alternatively, the perspective data can identify the lens or its attributes, so that optical distortion of the image can be characterized. In an index-based system, a six-bit code can be used to identify one of 64 different lenses.

With different types of imaging systems, different forms of perspective information may be appropriate. For example, in so-called "whisk broom" cameras (i.e., those that repeatedly acquire line scans from a moving viewpoint), the perspective information may additionally include the starting and ending positions (the latter may be expressed as an offset from the former, allowing some payload conservation).

In yet other embodiments, elevation data for different points in the image can be encoded through watermarks. In one such arrangement, elevation data is determined for points at 64-pixel gridded spacings across the image. These points are designated in FIG. 1 by the stars labeled 22. (Only a few such stars are shown in FIG. 1. The arbitrary origin 16 is also such a point.) The elevation may be expressed in absolute terms (e.g., feet above sea level), or relative to another reference (e.g., the elevation of the arbitrary origin). Again, 16 bits per elevation may be used. (Or if difference in elevation from the arbitrary origin is used, then 8-12 bits may suffice.)

In one such arrangement, the elevation data for each starred point is watermark-encoded in a 64 pixel by 64 pixel subpatch 24 centered around the star. Again, one such sub-patch 24 is shown in FIG. 1 by cross-hatching for ease of identification. More generally, these sub-patches 24 are the regions bounded by the fine, dotted lines in FIG. 1. Again, sub-patches 24 are tiled across the image, but each one conveys a (typically) different elevation payload.

(In the FIG. 1 arrangement, each patch 20 encompasses one full sub-patch 24, and parts of eight others. By this arrangement, elevation data is encoded for the points at each corner of each patch 20, as well as for the point at the center of the patch, and at points mid-way along each patch side boundary. In other embodiments, of course, sub-patches 24 can be sized and positioned differently relative to patches 20.)

The elevation watermark, based on patches 24, may be simply overlaid on the main watermark, based on patches 20. Desirably, however, there is some coordination between the two watermarks, so as to avoid extreme changes in any pixel values (as may occur, e.g., if both watermarks try to change a pixel by a maximum amount permitted by the respective watermarking technique). In one such coordination arrangement, each pixel in the image is assigned to one of the two watermarks. For example, 50-80% of the pixels in the image may be assigned to the main watermark, and 50-20% may be assigned to the elevation watermark. The assignment may be done based on a regular array, or a stochastic assignment may be used. In some cases, it may be prudent to allocate extra pixels to carry the elevation payload where—as in the upper right—the sub-patch 24 extends beyond the boundary of the image, limiting the number of pixels to convey elevation data (e.g., for arbitrary origin point 16).

(This coordination technique has applicability beyond the present context, and is generally applicable to a variety of watermarking applications in which plural watermarks are used.)

By techniques such as the foregoing, an image can be provided with extensive photogrammetric information that travels with the image, notwithstanding distortion, cropping, format conversion, etc.

This data can be exploited in various ways. One utilizes a computer system on which the image is displayed, e.g., on a monitor or screen. An operator uses an input device, such as a mouse, light pen, graphics tablet, or the like, to designate a particular point in the displayed image. In response to selection of the point (by clicking or other known selection technique), the computer processes the embedded watermark information and displays to the operator the precise latitude, longitude and elevation of the selected point.

Using the elevation data, the computer system can also generate, and render, a 3D view of the depicted landscape, from an arbitrary viewing angle. Surfaces that are hidden in the original image may be extrapolated using known techniques, and presented in a different color or texture to indicate their synthetic basis.

In embodiments in which the camera perspective is known, the projections of latitude and longitude lines on the depicted terrain can be adjusted, e.g., in accordance with variations in elevation. If the camera perspective is such that it is viewing down a downwardly-inclined slope, for example, the latitude or longitude lines that traverse this slope can be virtually placed more closely spaced together than would be the case if the camera view were orthogonal to the slope.

The mathematical manipulations associated with such operation are somewhat complex, but well within the skills of those working in the photogrammetric and mapping arts. To determine elevation at an arbitrary point and to generate 3D models, for example, the elevations at the starred points 22 are provided to an algorithm that applies a bi-cubic spline-fitting model so as to estimate the elevation at any point on the image.

(The computer system can take various forms, but most include conventional computer components such as one or more CPUs, volatile storage (e.g., RAM), non-volatile storage (e.g., ROM, fixed and removable magnetic disks, fixed and removable optical disks), interfaces (e.g., WAN, LAN, USB, modem, serial), input/output devices (e.g., monitor, keyboard, mouse, tablet, joystick, light pen), etc. Associated with the computer system is various software, including operating system software and applications software—the latter being programmed to perform the data processing and presentation operations detailed above. Naturally, such programming can be stored on fixed or removable computer storage media. In some embodiments, parallel or distributed computer architectures may be employed, e.g., with different components of the computer system being located remote from each other.)

A variety of aerial mapping and associated image database techniques can be used in conjunction with the present invention. Representative systems are shown, e.g., in patents U.S. Pat. Nos. 5,608,405, 5,926,581, 5,974,423, 6,023,278, 6,177,943, 5,995,681, 5,550,937 and 6,150,972.

To provide a comprehensive disclosure without unduly lengthening this specification, applicant incorporates by reference the patents publications and applications cited above.

Having described and illustrated the principles of the invention with reference to illustrative embodiments, it will be recognized that the invention can be modified in arrangement and detail without departing from such principles.

For example, while the "arbitrary origin" was the pixel in the upper-left corner of the image in the illustrative example, this placement is not critical. The arbitrary origin can be moved to any location, with relative measurements being adjusted accordingly.

Likewise, while the detailed embodiment contemplated that the coordinates of the arbitrary origin are literally encoded as part of the digital watermark payload, in other embodiments this need not be the case. Instead, e.g., the watermark payload can be an arbitrary identifier that identifies an entry in a data structure (e.g., table or database) in which the coordinate data is stored. The same index-a-remote-store approach can be used with any of the other payload data.

Although latitude/longitude/elevation were used as exemplary coordinates, it will be recognized that other coordinate geometries can alternatively be employed.

The main watermark payload is described as including coordinate, orientation, scale, and polynomial correction data. Depending on the application, certain of this data may be omitted, and/or certain additional information may be included in the watermark payload. The payload length is exemplary. Some embodiments can employ a payload that is considerably shorter (e.g., by abbreviating the bits dedicated to each data and/or omitting certain data). Other embodiments may employ a payload that is longer.

While elevation may be expressed in height above sea level, this need not be the case. Height relative to any other measure can alternatively be employed.

The illustrative embodiments' encoding of plural data (e.g., coordinate data, and lens data) in a single watermark payload is not essential. In other embodiments, the different elements of embedded information can be conveyed through distinct watermarks, e.g., layered over each other, interspersed between each other, coordinated with each other in the manner of the elevation watermark, etc.

In many embodiments, lossless data compression techniques (e.g., Lempel-Ziv based) can be employed to reduce the number of payload bits that are encoded in a watermark.

Although described in the context of watermarking for mapping and photogrammetric purposes, the principles detailed herein find application in many other watermarking applications, not limited to the purposes particularly detailed.

In view of the many embodiments to which the principles of the invention may be applied, it should be recognized that the detailed embodiments are illustrative only and should not be taken as limiting the scope of the invention. Rather, I claim as my invention all such embodiments as fall within the scope and spirit of the following claims, and equivalents thereto.

I claim:

1. A method comprising:
   receiving data representing an image or video; and
   utilizing a multi-purpose computer processor, steganographically encoding the data to include information representing polynomial coefficients associated with at least one geographic dimension.

2. The method of claim 1, wherein the geographic dimension comprises latitude.

3. The method of claim 1, wherein the geographic dimension comprises longitude.

4. The method of claim 1, wherein the geographic dimension comprises elevation.

5. The method of claim 1, wherein the geographic dimension comprises latitude and longitude.

6. The method of claim 1, wherein the polynomial coefficients are associated with the at least one geographic dimension through a warp model.

7. A programmed computing device storing instructions in memory, the instructions comprising:
   instructions for receiving data representing an image or video; and
   instructions for utilizing a multi-purpose computer processor programmed as a steganographic encoder, steganographically encoding the data to include information representing polynomial coefficients associated with at least one geographic dimension.

8. A computer readable media comprising instructions stored thereon, that if executed, cause a multi-purpose computer to perform operations comprising:
   receiving data representing an image or video; and
   utilizing a multi-purpose computer processor, steganographically encoding the data to include information representing polynomial coefficients associated with at least one geographic dimension.

9. The computer readable media of claim 8, wherein the polynomial coefficients are associated with the at least one geographic dimension through a warp model.

10. An apparatus comprising:
    electronic memory configured to buffer data representing an image or video; and
    a multi-purpose computer processor configured to steganographically encode the data to include information representing polynomial coefficients associated with at least one geographic dimension.

11. The apparatus of claim 10, wherein the geographic dimension comprises latitude.

12. The apparatus of claim 10, wherein the geographic dimension comprises longitude.

13. The apparatus of claim 10, wherein the geographic dimension comprises elevation.

14. The apparatus of claim 10, wherein the geographic dimension comprises latitude and longitude.

15. The apparatus of claim 10, wherein the polynomial coefficients are associated with the at least one geographic dimension through a warp model.

16. The apparatus of claim 10, wherein the multi-purpose computer processor steganographically encodes the data to include information representing polynomial coefficients associated with at least one geographic dimension.

17. A method comprising:
   obtaining data representing an image or video captured from an aerial platform; and
   utilizing a multi-purpose computer processor configured to:
      control communication of the data; and
      steganographically encode the data to include information representing polynomial coefficients associated with at least one geographic dimension.

18. The method of claim 17, wherein the polynomial coefficients are associated with the at least one geographic dimension through a warp model.

19. A computer readable media comprising instructions stored thereon, that if executed, cause a multi-purpose computer to perform operations comprising:
   obtaining data representing an image or video captured from an aerial platform;
   controlling communication of the data; and
   steganographically encoding the data to include information representing polynomial coefficients associated with at least one geographic dimension.

20. A programmed computing device storing instructions in memory, the instructions comprising:
   instructions for obtaining data representing an image or video captured from an aerial platform;
   instructions for controlling communication of the data; and
   instructions for steganographically encoding the data to include information representing polynomial coefficients associated with at least one geographic dimension.

* * * * *

UNITED STATES PATENT AND TRADEMARK OFFICE
CERTIFICATE OF CORRECTION

PATENT NO.         : 8,027,506 B2
APPLICATION NO.    : 12/401403
DATED              : September 27, 2011
INVENTOR(S)        : Rhoads Page 1 of 1

It is certified that error appears in the above-identified patent and that said Letters Patent is hereby corrected as shown below:

Title Page 3, item (56), under "Other Publications", in Column 1, Line 4, delete "Barlett," and insert -- Bartlett, --.

Title Page 3, item (56), under "Other Publications", in Column 1, Lines 9-10, delete "HH. Bruggemann" and insert -- H.H. Bruggemann --.

Title Page 3, item (56), under "Other Publications", in Column 2, Line 3, delete "Wayback Machines" and insert -- Wayback Machine --.

Title Page 3, item (56), under "Other Publications", in Column 2, Line 11, delete "occuring" and insert -- occurring --.

Title Page 3, item (56), under "Other Publications", in Column 2, Line 19, delete ""Digital 138-146. Watermark" and insert -- "Digital Watermark --.

Signed and Sealed this
Third Day of April, 2012

David J. Kappos
*Director of the United States Patent and Trademark Office*